Feb. 27, 1945.   F. J. HOOVEN   2,370,166
TIMING DEVICE
Filed Dec. 16, 1942   2 Sheets-Sheet 1

INVENTOR.
FREDERICK J. HOOVEN
BY Eber J. Hyde
ATTORNEY.

Patented Feb. 27, 1945

2,370,166

UNITED STATES PATENT OFFICE 2,370,166

TIMING DEVICE

Frederick J. Hooven, Dayton, Ohio, assignor to The Brush Development Company, Cleveland, Ohio, a corporation of Ohio Application December 16, 1942, Serial No. 469,237

27 Claims. (Cl. 161—15)

My invention pertains to timing devices, and more particularly to devices adapted to time short intervals with a high degree of accuracy.

An object of my invention is to provide an accurate short interval timing device.

Another object of my invention is to provide a small portable timing device.

A further object of my invention is to provide an accurate timing device wherein the degree of accuracy is constant even though the device is moved from place to place.

It is another object of my invention to provide a timing device the accuracy of which is substantially independent of mechanical means.

It is also an object of my invention to provide a timing device for quickly giving an accurate indication of a short time interval.

Other objects and a fuller understanding of my invention may be had by referring to the following specification and the accompanying drawings in which.

I have provided a means and method for accurately measuring short time intervals. Briefly the method is to provide an alternating signal the rate of oscillation of which need not be known or controlled, and to record the signal on a moving record member during the interval to be timed. Subsequent reproduction of the record will establish an alternating signal which can be applied to a calibrated averaging meter thereby giving an indication of the time interval.

This application is related to Semi Joseph Begun's application Serial Number 455,646 for a Timing device, and is primarily directed to a timing system utilizing a calibrated averaging device such as an electric current averaging meter for indicating time duration, and to the feature of strongly amplifying the electrical signal which is to be supplied to the averaging device and "chopping off" the top of the amplified signal to improve the accuracy of the system.

Figure 1:
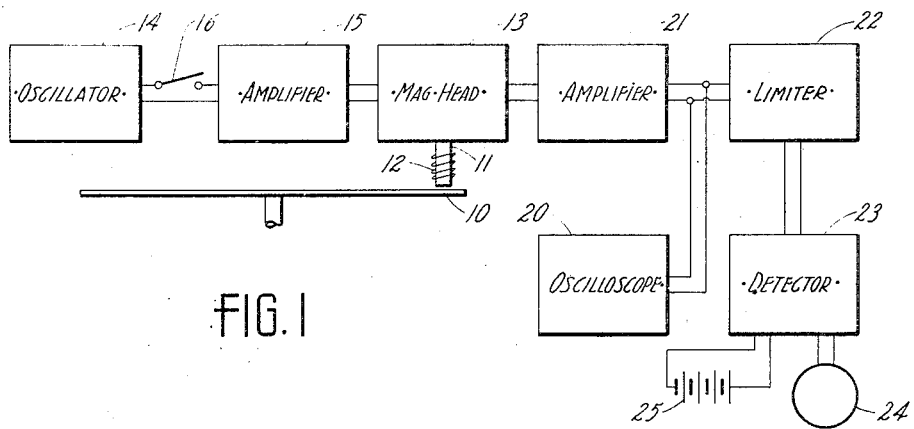
Figure 1 is a block diagram illustration of a form of my invention.

Figure 1 illustrates in block diagram form a system for indicating a time interval in which reference character 10 represents a moving record member such for example as an endless magnetizable tape or a disk of magnetizable material which is moving at a known and constant rate of speed. Positioned near the moving magnetizable material is a magnetic head indicated generally by the reference character 13 and comprised of a pole piece 11 which is in magnetic flux linkage relationship with the disk 10, and a coil 12 wound around the pole piece 11. An oscillator 14 is provided and its signal output is amplified by the amplifier 15 and is connected to the coil 12 of the magnetic head 13. Between the oscillator 14 and the amplifier 15 there is a switch 16 which is operated by a trigger circuit in accordance with the interval to be timed. The trigger circuit is preferably electronic and may be fired by any relay action, by photoelectric cells, or by bridge circuits, etc. It is also obvious that a mechanical trigger circuit could be used if it was desired, but mechanical actuation of the switch 16 may be less rapid and accurate than electronic actuation. An interval is timed by the trigger circuit closing switch 16 at the beginning of the interval, thereby establishing on the moving disk 10 a magnetic record of a number of oscillations of the oscillator 14. During this process the magnetic head 13 is a recording head and the signal current from the amplifier 15 passing through the coil 12 establishes a varying magnetic flux in the pole piece 11 and in the disk 10 which is passing close to the pole piece. The length of the record made on the disk 10 is directly proportional to the length of time the switch 16 was closed, and as this length of time was governed by the interval controlled trigger circuit the length of the record on the disk 10 must be directly proportional to the length of the interval to be timed.

Several methods of determining the length of the time interval from the record member 10 may be used. One of them comprises the steps of repeatedly reproducing the record from the disk 10 to establish a signal which is amplified by the amplifier 21, and then applying the amplified output signal to an oscilloscope 20 and there counting the number of cycles of the oscillator which were recorded. This process was shown, described, and claimed in Semi Joseph Begun's application Serial No. 437,395. The basis for accuracy in this system is the accuracy and stability of the oscillator. The number of oscillations per second must be known.

Another method of determining the length of the time interval from the record member is to know the rate of rotation of the record member and to determine by some means such as calibrated electric current averaging means the ratio between the length of recorded signal and the total length of the disk 10. This method is claimed in the present application.

In order to determine the length of the signal recorded on the disk 10, the coil 12 is disconnected from the recording circuit and is connected to the reproducing circuit thereby establishing the head as a reproducing head. The disk is driven past the pole piece 11 at a constant rate of speed, and the magnetic pattern in the disk will establish in the pole piece 11 a varying magnetic flux which cuts the loops of the coil 12 thereby generating an electromotive force. The electromotive force generated in the coil 12 is amplified by the amplifier 21, and the amplified current output is passed through one or more limiters 22 which "chop off" the peaks of each half wave length in order to reduce error due to variable amplitude of the reproduced wave. This is somewhat similar to a square wave generator. The limited wave is then fed into a detector 23 which "chops off" the other half of the wave and passes the remaining limited half to a current averaging meter 24 such as a milliammeter. Each revolution of the disk 10 causes an amount of current to be applied to the meter for a period of time which bears a direct relationship to the length of the magnetic pattern on the disk and it therefore has a direct relationship to the length of the interval to be timed. Because the meter 24 is of the averaging type the hand will be steady after a few revolutions of the magnetizable material. The scale on the face of the meter may be divided into units of time.

Two sources of error or inaccuracy may exist in this system. The first may be due to the variable amplitudes of successive cycles of the reproduced wave brought about by causes such as variations in the magnetic properties of the magnetizable disk 10. To reduce the error which may be due to this, I greatly amplify the signal "picked up" from the disk 10 and pass the amplified signal through the limiter 22 before it reaches the meter 24. The limiter 22 "chops off" the peak of each half wave length. If the signal is amplified enough at the amplifier 21 and then "chopped off" at the limiter 22 so that each half cycle is of the same amplitude, then the duration of each cycle of the resulting signal which is effective on the meter 24 will be substantially independent of the reproduced amplitude of the signal. Another source of error which may exist in this system is a meter reading arising from background noise which is always present in recording and reproducing systems. Background noise on the unrecorded portion of the disk, indicated by the reference character 43, will cause the meter to indicate a value which is erroneous, and background noise superposed on the signal corresponding to the interval to be timed will also introduce error. The error due to background noise superposed on the signal will be greatly reduced due to the action of the amplifier 21 and the limiter 22, but the other error remains undiminished. In order to reduce this other error there is provided a detector 23 between the head 13 and the meter 24, and it is so biased by battery 25 that any signals which are stronger than the background noise will be rectified, and the voltages caused by the background noise itself will be below the cut-off voltage of the rectifier. This feature is claimed in Semi J. Begun's copending application, Serial No. 455,646.

The averaging meter 24 has previously been calibrated by recording the output of the oscillator 14 on the disk 10 for a known portion of one revolution of the disk, and then reproducing the signal through the limiter 22 and the detector 23 to the meter 24. The signal recorded on the portion of the disk 10 will cause the hand of the meter to read a certain value; if, for example, the known portion which was recorded on the disk 10 was the entire length of the recording path on the disk, the meter can be adjusted to read 100 units. The duration of the interval to be timed must be shorter than the duration for one complete revolution of the disk 10. Accordingly, the record on the disk 10 established by the interval to be timed will extend over less than the entire length of the recording path on the disk, and when the record is reproduced and the output signal applied to the meter 24, the hand will indicate some value less than 100 units; say for example 50 units. The portion of the disk on which a recording was made is therefore ½, and knowing the rate of rotation of the disk 10; say for example 60 revolutions per second, the duration of the time interval may be determined to be $\frac{1}{120}$ of a second. It is obvious that the scale of the meter may directly indicate the time interval. That is, instead of reading 100 units or 50 units the hand would indicate $\frac{1}{60}$ of a second and $\frac{1}{120}$ of a second. The accuracy of this system depends primarily upon the rotation of the magnetizable record material at a known and constant rate, and the constancy of the oscillator is of secondary importance although it is advisable to use one which is fairly constant.

Another manner of reproducing the signal from the disk 10, in which the rate of rotation of the disk is immaterial so long as it is constant, is to calibrate the meter 24 by reproducing the signal into the oscilloscope 20 and counting the number of cycles which were recorded.

If the meter deflects 100 divisions for 100 cycles recorded on the disk, and the rate of oscillations as it was supplied by the oscillator is known, as for example 100,000 cycles per second, the time interval the meter reads will be one millisecond, and each meter devision would represent 10 microseconds. After the meter has been calibrated the subsequent readings may be made without first applying the signal to the oscilloscope 20 and a great saving of time will be effected. This system uses "cycle counting" for calibrating the meter 24, and thereafter uses an averaging process for obtaining the indication.

Figure 2:
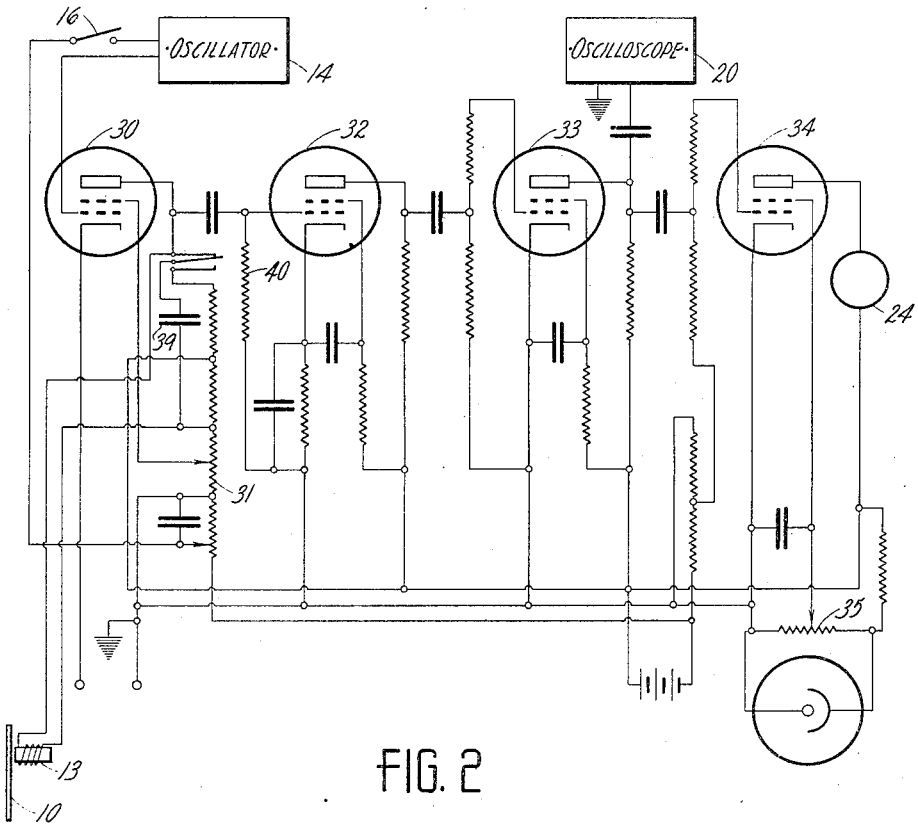
Figure 2 is a circuit diagram of a modified form of my invention.

Figure 2 is a detailed circuit for recording and repeatedly reproducing a signal corresponding to the interval to be timed, and comprises the combination recording, reproducing, and obliterating head 13 connected to the plate of the amplifier tube 30. A grid of the tube 30 is connected to the output of the oscillator 14, and the other grid of the tube is connected to a bias regulating potentiometer 31. Under normal conditions when no interval is being timed, the tube 30 is biased beyond cut off, and only upon the closing of the switch 16 by the trigger circuit will plate current flow and cause the head 13 to record on the magnetizable material 10. Upon opening the switch 16 by the trigger circuit the plate current will cease flowing and no further recording will be made on the magnetizable material. For reproducing the signal which has been recorded on the magnetizable material, the head 13 is connected through amplifier tubes 32 and 33 to the oscilloscope 20. The record material is repeatedly rotated thereby repeatedly reproducing a signal corresponding in duration to the duration of the time interval to be measured. The horizontal sweep of the oscilloscope is synchronized with the rate of rotation of the disk 10, and the signal derived from the magnetizable material is fed to the oscilloscope thereby providing a steady picture on the screen of the oscilloscope which makes it possible to count the number of cycles which were recorded on the magnetizable material during the interval to be timed. The amplified output from the amplifier-limiter tube 33 is also applied to rectifier tube 34, the bias of which can be changed by the potentiometer 35. The output from the rectifier tube 34 is then applied to the calibrated averaging meter 24 which gives an indication of the duration of the time interval.

Another method which may be used for calibrating the meter 24 is to apply a signal corresponding to a known time interval to the recording circuit, and repeatedly reproducing the disk record caused by the known time interval to establish a reproduced signal. The reproduced signal can then be limited and rectified, and the value read on the scale of the averaging meter. The deflection of the meter hand caused by the known time interval calibrates the meter, and deflections for unknown time intervals will bear a direct relationship with the length of the interval to be timed.

Between timing operations the endless magnetizable tape or disk must be obliterated or mixed records and inaccuracy will result. Many methods of obliteration have been devised. The one I show in this application was shown, described and claimed in Semi Joseph Begun's application Serial No. 437,395, and comprises charging a condenser 39, and discharging the condenser 39 through the coil around the pole piece of the magnetic head 13 to bring the value of the magnetic flux in the material 10 to a state of uniformity. A switch 40 is provided for connecting the condenser 39 to the head 13.

Figure 3:
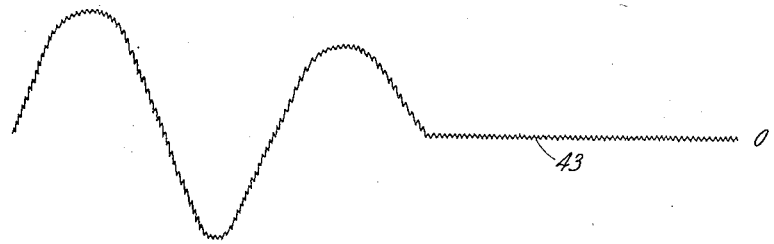
Figures 3 to 5 show diagrammatically the action of my invention on a signal wave.
Figure 4:
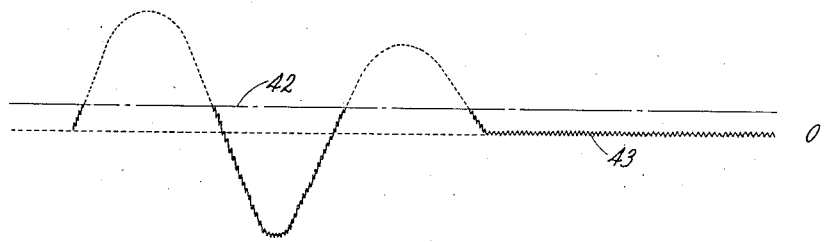
Figure 5:
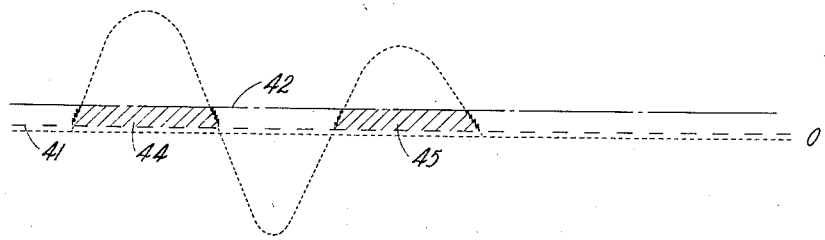

Figures 3 to 5 illustrate diagrammatically the action of my invention on a wave which is reproduced from the magnetic impression made in the magnetizable recording material and which has amplitude variations. These variations result from the differences in the magnetic characteristic of the magnetizable material for different points along the path of recording. This variation in amplitude is illustrated in exaggerated form in Figure 3 by showing the first cycle of greater amplitude than the subsequent cycles, and the background noise is illustrated by the waviness in the line 43.

In Figure 4 the action of the limiter is shown. The limiter "chops off" and flattens the peaks of every other half cycle. The portion of the signal above the line 42 is not passed to the averaging meter, and accordingly the inaccuracy due to the amplitude variation is greatly reduced.

The rectifier action is illustrated in Figure 5. The unlimited half-cycles of the signal are "chopped off" and thrown away, and due to the bias on the rectifier the amount of the signal discarded can be adjusted to include all or substantially all of the background noise. In Figure 5 this bias value is illustrated by the line 41. The shaded portions 44 and 45 comprise the signal which is passed to the averaging meter 24. The signal shown in Figures 3, 4, and 5, is not sinusoidal because we are recording on a saturated magnetizable material without using a polarizing current, thereby causing one-half of the signal to be in the saturation range. A sinusoidal wave could have been recorded by using a neutralized tape, or by using a saturated magnetizable material and a polarizing current.

Although I have described my invention with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

I claim as my invention:

1. The process of measuring a time interval comprising the steps of: providing a record member moving at a known and constant rate of speed, providing a signal, controlling the signal in accordance with the interval to be timed, recording at least the beginning and the end of said controlled signal on a path on said moving record member, repeatedly reproducing the record from the said moving record member to establish a reproduced signal, and utilizing the reproduced signal for establishing on a meter a single indication which compares the distance on the record member between the recorded beginning and end of the controlled signal with the total length of the path on the record member to determine the length of the time interval.

2. The process of measuring an unknown time interval comprising the steps of: providing a record member moving at a known and constant rate of speed, providing an alternating signal, controlling the alternating signal in accordance with the duration of the interval to be timed, making a record on the moving record member in accordance with the controlled signal thereby providing a record of at least the beginning and the end of the interval to be timed, repeatedly reproducing the record from the moving record member, and during the repeated reproduction establishing on a meter a single indication which compares the distance between the recorded beginning and end of the controlled signal with a standard record the length of which represents a known time interval in order to determine the length of the unknown time interval.

3. The process of measuring a time interval comprising the steps of: providing a magnetizable record member moving at a known and constant rate of speed, providing a signal for effecting a recording on the magnetizable member, controlling the duration of the signal in accordance with the interval to be timed to establish a record on the magnetizable member, repeatedly reproducing the record from the magnetizable member to establish a signal which is an indication of at least the beginning and the end of the record on the magnetizable member, and comparing on a meter the duration of the repeatedly established signal with the duration of a known time interval to determine the length of the interval to be timed.

4. The process of measuring a time interval comprising the steps of: providing an endless magnetizable record member moving at a known and constant rate of speed; calibrating a current averaging meter by magnetically recording a signal on said magnetizable record member for a known length of time, reproducing the record to establish an electric current, and applying said electric current to the averaging meter; recording magnetically on said record member during the interval to be timed, repeatedly reproducing the record from the record member to establish repeatedly and periodically an electric current bearing a relationship to the length of the time interval, and repeatedly applying the periodically occurring current to the averaging meter to obtain a proportion which is an indication of the amount of recording on the record member.

5. The process of measuring a time interval comprising the steps of: providing an endless record member rotating at a known and constant rate of speed, providing a signal, providing a current averaging meter, calibrating said averaging meter by establishing a record of said signal on said endless member for a known length of time and repeatedly reproducing said record to establish an output current and feeding said current into said meter; controlling the duration of said signal by the time interval to be measured, making a record on said endless material in accordance with the controlled signal, repeatedly reproducing the record from the endless material to establish an output current signal, and applying the output current signal to the calibrated current averaging meter.

6. A timing device comprising in combination, an endless record member, means for cyclically moving said record member at a known and constant rate of speed, a source of signal, a trigger circuit for controlling the signal in accordance with the interval to be timed, recording means connected to said source of signal and adapted to establish on a path on the moving member a record of the controlled signal, reproducing means associated with said moving record member and adapted to establish a current signal in accordance with the record thereon for each revolution of the endless member, means for repeatedly revolving said endless member, and current indicating means connected to said reproducing means for indicating the duration of the interval to be timed by indicating the value of the current established in accordance with the recorded portion of the record member averaged over the time required for the total length of the recording path on the record member to pass said reproducing means.

7. A timing device comprising in combination, an endless record member, means for repeatedly rotating said endless member at a known and constant rate of speed, a source of signal, a trigger circuit for controlling the signal in accordance with the duration of the interval to be timed, recording means connected to said source of signal and adapted to establish on a path on the endless member a record of at least the beginning and the end of the interval to be timed, reproducing means associated with said moving endless member and adapted to establish a current signal in accordance with the record thereon for each revolution of the endless member, means for repeatedly revolving said endless member, whereby said current signal is repeatedly established, and indicating means of the current averaging meter type connected to said reproducing means for comparing the distance between the beginning and the end of the record of the controlled signal with the total length of the path on the endless member by averaging the value of the established current signal for one occurrence thereof over the length of time of one revolution of said record member.

8. A timing device comprising in combination, an endless magnetizable record member, means for rotating said magnetizable member at a known and constant rate of speed, a source of signal, means for controlling the signal in accordance with the interval to be timed, magnetic recording means associated with said magnetizable record member and connected to said source of signal, magnetic reproducing means associated with said magnetizable member, said magnetizable member being repeatedly driven past said magnetic reproducing means to repeatedly establish a current signal the length of which bears a relationship to the length of the interval to be timed, and means for indicating the duration of the signal which is repeatedly established by the magnetic reproducing means by averaging the value of the current established during one occurrence of said current signal over the time necessary for one complete revolution of said record material.

9. The process of measuring a time interval comprising the steps of: providing a record member moving at a known and constant rate of speed, providing a signal, controlling the signal in accordance with the interval to be timed, recording the controlled signal on the said moving record member, repeatedly reproducing the record from the moving record member to establish a current signal, amplifying the current signal, limiting the amplitude of the current signal, and averaging the current signal over a known length of time.

10. A timing device comprising, in combination, a magnetizable disk, means for rotating said disk at a known and substantially constant rate of speed, a source of signal controlled according to the interval to be timed, recording means connected to said source of signal and adapted to magnetically record on said magnetizable disk a magnetic pattern corresponding to the length of said interval to be timed, reproducing means associated with the magnetizable disk for generating a current signal corresponding in duration to the recorded magnetic pattern, and meter means for averaging the reproduced current signal, over a known length of time.

11. A timing device comprising, in combination, a disk upon which a record may be made, means for rotating said disk at a known and substantially constant rate of speed, a source of alternating signal controlled according to the interval to be timed, recording means connected to said source of signal and adapted to make a record on said disk corresponding to the length of the interval to be timed, reproducing means associated with said disk for establishing an alternating current signal corresponding in duration to the record on the disk, means for rectifying said reproduced alternating current signal, and meter means for averaging the rectified signal, over a known length of time.

12. A timing device comprising, in combination, a rotatable plate of magnetizable material, means for rotating said plate at a known and substantially constant rate of speed, magnetic recording means associated with said magnetizable plate, a source of alternating current connected to said recording means and adapted to establish an alternating flux in said recording head and in said plate, means for controlling the length of the flow of alternating current in accordance with the interval to be timed to establish in said plate through application of flux an alternating magnetic path having a length which bears a relationship to the length of the interval to be timed, magnetic reproducing means associated with said plate and adapted to establish an alternating current signal in accordance with the alternating magnetic pattern in the plate, current rectification means connected to said reproducing means, current averaging means connected through the rectification means to said reproducing means for averaging the current over a known length of time, and indicator means connected to and actuated by said current averaging means for presenting an indication of the duration of the time interval as said plate is repeatedly rotated with respect to said reproducing means.

13. In a magnetic recording and reproducing device; a magnetic transducer means adapted to record and reproduce a signal, magnetizable record means associated with and adapted to move at a known and substantially constant rate of speed with respect to said magnetic transducer means during the recording and reproducing of a signal on said magnetizable record means, signal generating means, an amplifier tube having two grids connected in a circuit between said signal generating means and said transducer means, signal output means, the first of said amplifier tube grids being connected to the signal generating means and the second of said amplifier tube grids being connected to said signal output means, and bias regulating means connected to said second grid for regulating the bias on the said amplifier tube to a value which automatically causes the amplifier tube to become a recording amplifier and the transducer means to become a signal recording means when signal is supplied to said first grid, and to cause said amplifier tube to become a reproducing amplifier and the transducer means to become a signal reproducing means when no signal is supplied from the signal generating means and when signal is supplied from the magnetizable record means to the transducer head.

14. The process of measuring a time interval comprising the steps of: providing an endless magnetizable record member cyclically moving at a known and constant rate of speed, providing an alternating electrical signal, controlling the duration of the alternating signal in accordance with the duration of the time interval to be measured, establishing a magnetic record on said record member in accordance with the interval controlled alternating signal during only one cycle of movement of said record member, repeatedly reproducing the said magnetic record to obtain an alternating electrical current output signal having a certain peak amplitude, and applying said output signal to current averaging means calibrated in accordance with the certain peak amplitude of the said output signal.

15. The process of measuring a time interval comprising the steps of: providing an endless record member cyclically moving at a known and constant rate of speed, providing an alternating electrical signal, controlling the duration of the alternating signal in accordance with the duration of the time interval to be measured, establishing a record on said record member in accordance with the interval controlled alternating signal during only one cycle of movement of said record member, repeatedly reproducing the said record to obtain an alternating electrical current output signal having a certain amplitude, providing current averaging means calibrated in accordance with the certain amplitude of said output signal, and applying said output signal to the said current averaging means.

16. The process as set forth in claim 14 further characterized by the steps of amplifying the alternating electrical current output signal, limiting the peaks of the alternating cycles, and applying said amplified and limited output signal to a current averaging means calibrated in accordance with the peak amplitude of the limited signal.

17. The process as set forth in claim 15 further characterized by the steps of amplifying the alternating electrical current output signal, limiting the peaks of the alternating cycles thereof, and applying the amplified and limited output signal to a current averaging means calibrated in accordance with the peak amplitude of the limited signal.

18. A timing device comprising, in combination, an endless magnetizable record member, means for cyclically driving said magnetizable member at a known and constant rate of speed such that the time of one cycle thereof is greater than the duration of the interval to be timed, a source of alternating signal, magnetic recording means connected to said source of alternating signal and associated with said magnetizable member for magnetically recording signals thereon, means for controlling the duration of the said alternating signal in accordance with the duration of the interval to be timed whereby during only one cycle of said magnetizable member there is recorded a magnetic pattern having a length bearing a relationship to the duration of the interval to be timed, magnetic reproducing means associated with said magnetizable member for reproducing the pattern thereon once during each of a succession of cycles of motion of said magnetizable member past said magnetic reproducing means whereby there is obtained a succession of alternating current output signals each having a certain peak amplitude and each having a duration corresponding to the duration of the interval to be timed, and electrical current averaging means calibrated in accordance with the said certain peak amplitude of the reproduced signal connected to said magnetic reproducing means for giving an indication of the duration of the interval to be timed.

19. A timing device comprising, in combination, an endless record member, means for cyclically driving said endless member at a known and constant rate of speed such that the time of one cycle thereof is greater than the duration of the interval to be timed, a source of alternating signal, recording means connected to said source of alternating signal and associated with said endless member for recording signals thereon, means for controlling the duration of the said alternating signal in accordance with the duration of the interval to be timed whereby during only one cycle of said endless member there is recorded a signal pattern having a length bearing a relationship to the duration of the interval to be timed, reproducing means associated with said endless member for reproducing the signal thereon once during each of a succession of cycles of motion of said endless member past said reproducing means whereby there is obtained a succession of alternating current output signals each having a certain peak amplitude and each having a duration corresponding to the duration of the interval to be timed, and electrical current averaging means calibrated in accordance with said certain peak amplitude of the reproduced signal connected to said reproducing means for giving an indication of the duration of the interval to be timed.

20. A timing device comprising, in combination, an endless magnetizable record member, means for cyclically driving said magnetizable member at a known and constant rate of speed such that the time of one cycle thereof is greater than the duration of the interval to be timed, a source of alternating signal, magnetic recording means connected to said source of alternating signal and associated with said magnetizable member for magnetically recording signals thereon, means for controlling the duration of the said alternating signal in accordance with the duration of the interval to be timed whereby during only one cycle of said magnetizable member there is recorded a magnetic pattern having a length bearing a relationship to the duration of the interval to be timed, magnetic reproducing means associated with said magnetizable member for reproducing the pattern thereon once during each of a succession of cycles of motion of said magnetizable member past said magnetic reproducing means whereby there is obtained a succession of alternating current output signals each having a certain peak amplitude and each having a duration corresponding to the duration of the interval to be timed, means for amplifying said reproduced signals, means for limiting the peaks of the amplified reproduced signal, and electrical current averaging means calibrated in accordance with the peak amplitude of the limited signal connected to said magnetic reproducing means for giving an indication of the duration of the interval to be timed.

21. A timing device comprising, in combination, an endless record member, means for cyclically driving said endless member at a known and constant rate of speed such that the time of one cycle thereof is greater than the duration of the interval to be timed, a source of alternating signal, recording means connected to said source of alternating signal and associated with said endless member for recording signals thereon, means for controlling the duration of the said alternating signal in accordance with the duration of the interval to be timed whereby during only one cycle of said endless member there is recorded a signal pattern having a length bearing a relationship to the duration of the interval to be timed, reproducing means associated with said endless member for reproducing the signal thereon once during each of a succession of cycles of motion of said endless member past said reproducing means whereby there is obtained a succession of alternating current output signals each having a certain peak amplitude and each having a duration corresponding to the duration of the interval to be timed, means for amplifying said reproduced signals, means for limiting the peaks of said amplified signals, and electrical current averaging means calibrated in accordance with the peak amplitude of the limited signal.

22. The process of measuring a time interval comprising the steps of: providing a record member moving at a known and constant rate of speed, providing a signal, controlling the signal in accordance with the interval to be timed, recording the controlled signal on the moving record member, repeatedly reproducing the record from the moving record member to establish a reproduced signal, detecting the reproduced signal, amplifying the reproduced signal, limiting the amplitude of the amplified reproduced signal, and applying the detected and limited signal to calibrated signal averaging means.

23. The process as set forth in claim 22, further characterized in this; that the said record member is magnetizable, and the said signal is an alternating signal.

24. The process as set forth in claim 22, further characterized in this; that the said signal is an alternating signal and its duration is controlled in accordance with the duration of the interval to be timed.

25. The process as set forth in claim 22, further characterized in this; that the said record member is endless and the step of recording the signal is completed during one cycle thereof, and the step of repeatedly reproducing the record takes place during repeated cycles of motion of the record member.

26. The process of measuring a time interval comprising the steps of: providing a disk of magnetizable material, cyclically rotating the disk of magnetizable material at a constant rate of speed, providing an alternating electrical signal, controlling the duration of the alternating electrical signal in accordance with the duration of the time interval to be measured, establishing by magnetic means a magnetic record on said disk in accordance with the interval controlled alternating signal during only one rotation of said disk, repeatedly reproducing the recorded magnetic signal by magnetic means to repeatedly obtain an alternating electrical current output signal, strongly amplifying said alternating current signal, severely limiting the amplified signal, rectifying the output signal, and applying the amplified, limited, and rectified signal to current averaging meter means calibrated in accordance with the said alternating electrical current output signal.

27. The process of measuring a time interval comprising the steps of: providing a record material moving at a known and constant rate of speed, providing a continuous signal, controlling the signal in accordance with the interval to be timed, recording the controlled signal on the said record material, repeatedly reproducing the record from the moving record material to establish a reproduced signal, and applying the reproduced signal to calibrated signal averaging means.

FREDERICK J. HOOVEN.